(12) United States Patent
Liguori

(10) Patent No.: US 10,853,068 B2
(45) Date of Patent: Dec. 1, 2020

(54) METHOD FOR OPERATING A DIGITAL COMPUTER TO REDUCE THE COMPUTATIONAL COMPLEXITY ASSOCIATED WITH DOT PRODUCTS BETWEEN LARGE VECTORS

(71) Applicant: Ocean Logic Pty Ltd, Manly (AU)

(72) Inventor: Vincenzo Liguori, Dee Why (AU)

(73) Assignee: Ocean Logic Pty Ltd, Manly (AU)

( * ) Notice: Subject to any disclaimer, the term of this patent is extended or adjusted under 35 U.S.C. 154(b) by 0 days.

(21) Appl. No.: 16/147,292

(22) Filed: Sep. 28, 2018

(65) Prior Publication Data
US 2020/0104131 A1 Apr. 2, 2020

(51) Int. Cl.
*G06F 9/30* (2018.01)
*G06F 17/16* (2006.01)

(52) U.S. Cl.
CPC ........ *G06F 9/30036* (2013.01); *G06F 9/3001* (2013.01); *G06F 17/16* (2013.01)

(58) Field of Classification Search
CPC ........ G06F 17/10; G06F 17/15; G06F 17/153; G06F 7/544; G06F 7/5443; G06N 20/00; G06N 20/10; G06N 20/20; G06N 3/02–063; G06N 7/00–08
See application file for complete search history.

(56) References Cited

U.S. PATENT DOCUMENTS

| | | | |
|---|---|---|---|
| 6,766,286 B2 * | 7/2004 | Acharya | G06F 17/148 382/240 |
| 2013/0246496 A1 | 9/2013 | Craske | |
| 2014/0126824 A1 | 5/2014 | Vitaladevuni | |
| 2014/0172937 A1 | 6/2014 | Linderman | |

OTHER PUBLICATIONS

T. Fischer, A Pyramid Vector Quantizer, IEEE Transactions on Information Theory, vol. IT-32, No. 4, 1986 (Year: 1986).*
A. Hung, et. al., Error-Resilient Pyramid Vector Quantization for Image Compression, IEEE Transactions on Image Processing, vol. 7, No. 10, 1998 (Year: 1998).*
Powerpoint presentation, Pyramid Vector Quantization, https://people.xiph.org/~tterribe/daala/pvq201404.pdf, Xiph.org, 2014 (Year: 2014).*
V. Ligouri, Vector Quantization for Machine Vision, http://www.ocean-logic.com/downloads.htm, 2016 (Year: 2016).*

(Continued)

*Primary Examiner* — Andrew Caldwell
*Assistant Examiner* — Emily E Larocque
(74) *Attorney, Agent, or Firm* — Calvin B. Ward

(57) ABSTRACT

The present invention includes a method for operating a data processing system to compute an approximation to a scalar product between first and second vectors in which each vector is characterized by N components. The method includes replacing the first vector by a third vector that is a pyramid integer vector characterized by N components and an integer K equal to the sum of the absolute values of the N components, and computing a scalar product of the third vector with the second vector to provide the approximation to the scalar product between the first and second vectors. Computing the scalar product of the second and third vectors can be carried out by K additions followed by one floating point multiply.

7 Claims, 3 Drawing Sheets

(56) References Cited

OTHER PUBLICATIONS

V. Ligouri, Pyramid Vector Quantization for Deep Learning, http://www.ocean-logic.com/downloads.htm, 2017 (Year: 2017).*

V. Ligouri, Pyramid Vector Quantization and Bit Level Sparsity Weights for Efficient Neural Networks Inference, http://www.ocean-logic.com/downloads.htm, 2019 (Year: 2019).*

International Search Report, PCT/AU/2017/000071, dated Jun. 26, 2017.

Preliminary Report of Patentability, PCT/AU2017/000071, dated Oct. 11, 2018.

Egecioglu, et al., Dimensionality Reduction and Similarity Computation by Inner-Product Approximations, IEEE Transactions on Knowledge and Data Engineering, vol. 16, No. 6, Jun. 2004.

* cited by examiner ns METHOD FOR OPERATING A DIGITAL COMPUTER TO REDUCE THE COMPUTATIONAL COMPLEXITY ASSOCIATED WITH DOT PRODUCTS BETWEEN LARGE VECTORS

RELATED APPLICATIONS

This application is a continuation under 35 U.S.C. § 111 of PCT/AU2017/000071 filed on Mar. 23, 2017, said PCT application claiming priority from Australian Provisional Application 2016901146 filed Mar. 29, 2016, said patent applications being incorporated by reference herein.

BACKGROUND OF THE INVENTION

Digital signal processing has become commonplace. For example, signal filters such as low pass filters, band pass filters, and high pass filters are now implemented by digitizing the analog signal to create a sequence of digital values that are then processed via a finite impulse filter in which a scalar or "dot" product of a vector of the signal values and a vector of filter coefficients provide a digital value representing the filtered signal at each instance of time.

The scalar product of two N component vectors, A and B is defined to be $$A \cdot B = \Sigma_1^N A_i * B_i$$

where $A_i$, and $B_i$ are the $i^{th}$ component of A and B, respectively, and N is the number of components in each vector. The computational workload inherent in performing this computation is N multiplies and N−1 additions. The computational load for a multiply is significantly larger than that for an addition. In the simple case of integer multiplies and adds, a multiply is carried out by N adds and N−1 shifts. In the more complex case of floating point numbers, the computational load is even greater. Hence, when the application requires the scalar product of two large vectors, the computational workload can place practical limits on the underlying filter or other models.

For example, the quality of a digital filter typically increases with the size of the vectors involved. A band pass filter with 50 filter coefficients has significantly less out-of-band rejection than a filter with 500 filter coefficients. Unfortunately, the computational workload inherent in the larger filter can make that superior filter unattractive. Similarly, pattern recognition systems that utilize algorithms based on neural-networks are faced with performing large numbers of scalar products.

SUMMARY

The present invention includes a method for operating a data processing system to compute an approximation to a scalar product between first and second vectors in which each vector is characterized by N components. The method includes replacing the first vector by a third vector that is a pyramid integer vector characterized by N components and an integer K equal to the sum of the absolute values of the N components, and computing a scalar product of the third vector with the second vector to provide the approximation to the scalar product between the first and second vectors.

In one aspect of the invention, computing the scalar product of the second and third vectors includes adding each component of the second vector into a register a number of times specified by a corresponding one of the components in the third vector to provide the scalar product of the second and third vectors.

In another aspect of the invention, the second vector is characterized by a second vector length, the third vector is characterized by a third vector length, and the scalar product of the second and third vectors is corrected for a difference in the second vector length and the third vector length to provide the approximation to the scalar product of the first and second vectors.

In another aspect of the invention, the approximation to the scalar product of the first and second vectors is characterized by an allowable error in the scalar product of the first and second vectors, and K is chosen to have the smallest value for which the scalar product of the second and third vectors differs from the scalar product of the first and second vectors by less than the allowable error. In one aspect, K<N.

In another aspect of the invention, said components of said first vector are characterized by a numerical representation requiring a predetermined number of bits, n, and K<nN.

DETAILED DESCRIPTION

Figures 1, 2:
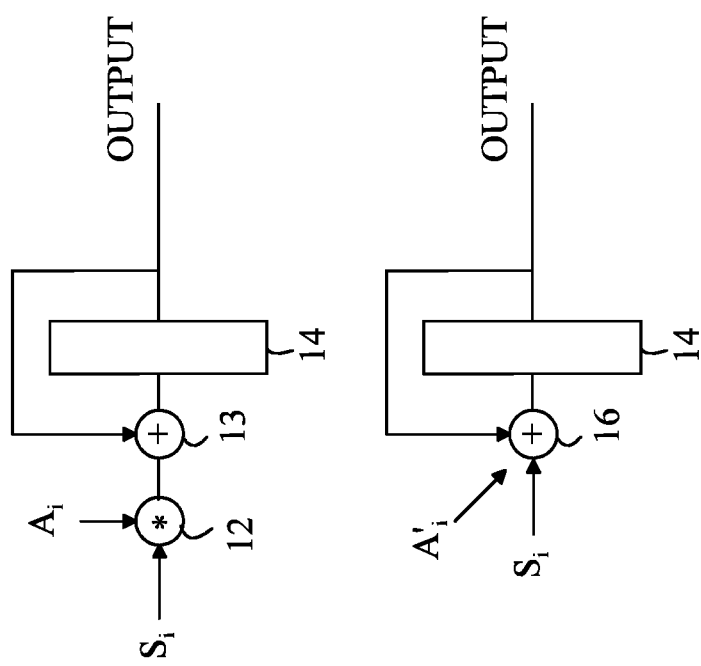
FIG. 1 illustrates the conventional computing hardware for computing a scalar product between A and S.
FIG. 2 illustrates the hardware for computing the scalar product of integer component vector with S.

The manner in which the present invention provides its advantages can be more easily understood with reference to a simple band pass filter that is implemented as a finite response filter on a computational engine that generates the scalar product of a filter coefficient vector with a vector of the same length derived from a signal that has been digitized to provide a sequence of digital values that represent the signal intensity as a function of time. Denote the filter coefficient vector by $A=[A_1, A_2, \ldots, A_N]$. In general, the signal consists of a sequence of digital values, $D_i$ for i=1 to $N_D$, where $N_D >> N$. The signal can be viewed as being shifted into a register that is N cells long. The values in this register correspond to a signal vector, $S=[S_1, S_2, \ldots, S_N]$. After each scalar product between A and S is computed, the contents of the register are shifted by a predetermined number of cells and new values of $D_i$ are shifted into the register. The sequence of scalar products generated in this manner form the output digital signal from the filter.

In real time applications, the scalar product must be computed in a time that is less than the time needed to generate the next set of signal values to be shifted into the register and shifting that register. While the time constraints can be relaxed by parallel processing, the cost of the additional hardware may limit the extent to which this option for improved speed can be used.

The present invention is based on the observation that in some cases of interest, the vector A can be replaced by an approximation vector A' of the same length which has two properties of interest. First, the scalar product of A' and S is a good approximation to the scalar product of A and S.

Second, the scalar product of A' and S requires significantly less computational resources than the scalar product of A and S.

The degree of error that can be tolerated in approximating A depends on the specific application in which the scalar product is being used. Consider a conventional digital filter implemented as a finite impulse response filter operating on a digital sequence generated by digitizing the output of some sensor. The signal being filtered will have some level of noise that results from noise in the sensor and digitization noise introduced by the analog-to-digital converter (ADC) used to convert the sensor analog output voltage as a function of time to a digital sequence, $D_i$. The output signal from the filter consists of another digital sequence, $F_i$. Each output sequence value is obtained by forming the scalar product of A with a vector whose components are a subsequence of the input digital sequence. For example, the output signal value, $F_k$, is obtained by the scalar product of A with the vector $[S_k, S_{k+1}, \ldots, S_{k+N-1}]$. The output signal will also have some level of noise that results from the noise in the input signal. If A is replaced by A', additional noise will be introduced into the output signal. If the additional noise is much less than the noise resulting from the noise in the input signal, the additional noise will not significantly alter the accuracy of the output signal. For example, if A' is chosen such that the additional noise introduced by the approximation to A is less than 25 percent of the noise introduced by the signal, the approximation will have little effect on the output noise amplitude.

One method for reducing the computational load imposed by the scalar product is to use an approximation vector in which all of the components of the vector are integers. Such a vector will be referred to as an integer component vector in the following discussion. If the input data stream is a sequence of integers, then the scalar product can be computed using only integer multiplies and adds, which require significantly less computational resources than real multiplies and adds. If the input signal was generated by an ADC operating on a sensor output that does not have very large voltage differences, the input data stream can be conditioned to be such an integer data stream.

One method for generating an integer component vector for A is to scale A such that the absolute value of the largest component in A is well approximated by an integer of the desired maximum size. The components of the scaled vector are then rounded to integers. For the purposes of the present discussion, this type of quantization scheme will be referred to as scalar quantization, as the components are approximated one at a time without regard to the other components of the vector. While this simple algorithm generates an integer component vector, the integer component vector is not necessarily the best integer component vector from the point of view of reducing the noise introduced by the approximation or reducing the computational complexity. Furthermore, even in the case of an integer component vector as A', the scalar product still requires N multiplies and N−1 adds. If the signal vector is a vector of real numbers, the computational savings of having multiplies that involve one integer and one real number are significantly less.

The present invention makes use of the observation that in many real world problems that require scalar products, the coefficients of the vector to be approximated by an integer component vector have a particular statistical property. Consider the components of the vector as a set of numbers that have a statistical distribution. If the statistical distribution is Laplacian, a more optimal integer component vector can be found. Moreover, a plurality of integer component vectors having different approximation errors can be generated, and the one that provides the best computational reduction for a given error can be determined. Many problems of interest involve a vector A whose components have a statistical distribution that is approximately Laplacian.

For the purposes of the present discussion, assume that the components of A have a substantially Laplacian distribution. Consider the simple integer component vector, A', generated by scaling A and rounding the components as discussed above. Denote the sum of absolute values of the integer components of A' by K. N and K define a set of integer component vectors in an N-dimensional space. For the purposes of the present discussion, these vectors will be referred to as pyramid vectors. Such sets of vectors and the methods for generating them are known in vector quantization arts, and hence, will not be discussed in detail here. For the purposes of this discussion, it should be noted that this set of vectors is optimal for representing vectors in the N-dimensional space by integer component vectors if the statistical distribution of the components is Laplacian and the quantized components have absolute values that sum to K. Hence, for a given K, the integer component vector in this set that has a direction in the N-dimensional space that is closest to the direction of A provides the best choice for A' with this particular K. It can also be shown that the scalar product of A' and some other vectors can be accomplished with K additions. As K is increased, the number of vectors in this set also increases, and hence, a better approximation for A can be found by increasing K. Hence, there is a tradeoff between the computational workload and error generated by approximating A by A'.

The error introduced by the approximation of A by A' can be measured in many cases. For example, in the case of a filter, the band pass and out-of-band rejection of the filter can be determined for the approximation filter for each K value. The minimum K value that provides an acceptable pass band and out-of-band rejection can then be used. If an error bound is known, then the approximation of the present invention can be tried for some sample of expected vectors, S. If the error bound is met, the approximation can be used.

Refer now to FIG. 1, which illustrates the conventional computing hardware for computing a scalar product between A and S. To simplify the drawing the control circuitry has been omitted from the drawing. In general, there is a register 14 that is initially set to zero. For each i from 1 to N, $S_i$ and $A_i$ are inputted to a multiplier 12 whose output is input to an adder 13 that adds the multiplier output to the current contents of register 14. At the end of the process, register 14 stores the scalar product.

As noted above, the computational workload to compute a scalar product with an integer component vector characterized by K is K additions. Refer now to FIG. 2, which illustrates the hardware for computing the scalar product of integer component vector with S. Again, to simplify the drawing, the control circuitry has been omitted from the drawing. At the start of the computation, register 14 is again set to zero. Consider the contribution to the scalar product by the $i^{th}$ component of A', which is $A'_i * S_i$. That contribution could be generated by a multiply followed by adding the contribution to the contents of register 14. Alternatively, the contribution can be generated by adding $S_i$ to the contents of register 14 $A'_i$ times using adder 16. For the purposes of the present discussion, a hardware component that performs a multiplication involving an integer, j and a second number, x, by adding x to an accumulator j times will be referred to as a repeated add multiplier in the following discussion. If j is negative, the repeated add multiplier subtracts x from the accumulator. Since the sum of the absolute values of the $A'_i$ is K, K additions in total are needed. Note that x may be a floating point number or integer.

The scalar product requires N multiplies. If each component's contribution is provided by a repeated add multiplier, the total number of adds is K, assuming that the register is reset to 0. If the number of bits needed to represent the mantissa of the components of A, is n, each multiple will require at least n add and n−1 shift operations. There will also be an additional N−1 add operations. Hence, the total workload will be greater than Nn+N−1 adds because of the shift operations. Accordingly, if K is less than Nn+N−1, a net computational saving will be achieved by using the pyramid vector approximation and repeated addition multiplies.

Even if a scalar quantization of A is used, typically, n will be at least 16; hence, the computational load inflicted by doing the multiplies will require 16 additions and 15 shifts. Which method requires the least computational workload depends on the size of the components in A'. Conversely, the scalar product of an A' with S in which A' has many small components, i.e., integer values between −15 and 15, can be implemented in significantly less time by using a repeated add multiplier for the multiply operation. Accordingly, it is advantageous to chose A' such that it has a large number of small components. If K<16*N, a net savings will be achieved.

It should be noted that the integer component vectors in the set of vectors defined for a particular N and K have some predetermined lengths that will, in general, differ from the length of A. Denote the vector obtained from the set defined by N and K by Y. In general, Y, will have a length that is different from A. Hence, $$A'=cY$$

where c is the ratio of the length of A to the length of Y. Hence, $$A' \cdot S = c\Sigma_{i=1}^{N} Y_i * S_i$$

The scalar product requires one multiply in addition to the N products, which as noted above can be carried out as K−1 additions.

While the computational workload of performing a scalar product with the integer component vectors discussed above is bounded by one real multiply and the time for K−1 additions, in practice, the workload can be less than this bound. As noted above, if the absolute value of $A'_i$ is less than a value related to the number of bits required to store the maximum $A'_i$ value, the product of that $A'_i$ and the corresponding component, $S_i$, can be carried out in a repeated add multiplier with $A'_i$ adds or subtracts instead of a conventional multiply. The K−1 addition bound corresponds to carrying out all of the $A'_i * S_i$ contributions to the scalar product by using a repeated add multiplier for computing the products with the accumulator being initially set with the value of the first non-zero S component. If the accumulator in the repeat and add multiplier is set to zero at the beginning of the scalar product computation, K adds are required. However, in some cases, $A'_i$ for some values of i have absolute values that are greater than this cut-off. In those cases, it is computationally more efficient to perform a conventional multiply. In one aspect of the invention, the components of A' are grouped such that the $S_i$ and components with small $A'_i$ values are sent to a repeated add multiplier while those with greater absolute values are sent to a conventional multiplier.

The computational workload to find the approximation vector that provides the lowest computational workload when executing a scalar product with an unknown vector and still providing sufficient accuracy in the scalar product is much greater than the computational workload inherent in performing one scalar product. Hence, the method of the present invention is best suited for situations in which a large number of scalar products using the same vector A are to be performed. Many examples of this type of situation are known in the art. Finite impulse response filters and pattern recognition based on neural networks are examples of situations in which the advantages of the present invention can provide significant savings and/or significant improvements in the results.

Figure 3:
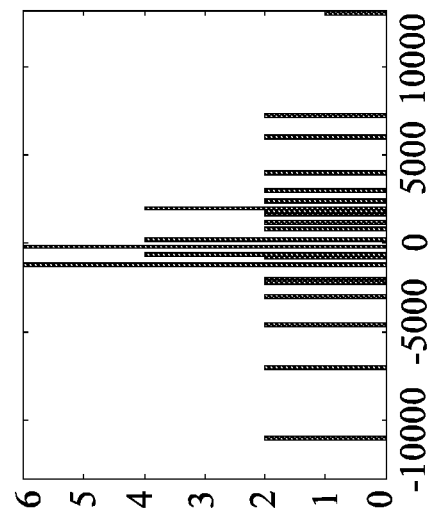
FIG. 3 illustrates the distribution of integer values.

An example of a finite impulse response filter will now be discussed in more detail with reference to a particular band pass filter to illustrate the manner in which the reduced computational workload of the present invention can be used to implement a finite impulse response filter with the same computational workload as a conventional finite impulse response filter while having better filter properties. Consider a conventional finite impulse response band pass filter with a pass band between 220 and 400 Hz that has 57 "taps", i.e., N=57. In a conventional implementation, the finite impulse response filter requires 57 floating point multiplies and 56 floating point additions to generate one sample of the output signal stream. The floating point multiplies can be removed by replacing the real filter coefficients by integers after scaling the floating point coefficients and then rounding the coefficients to the nearest integer. The distribution of integer values is shown in FIG. 3. It should be noted the coefficients require a 16 bit integer to represent each coefficient, and essentially all of the filter coefficients are too large for all the multiplications in the scalar products to be replaced by repeated add multipliers. Accordingly, each multiplication in the scalar product requires 16 adds and 15 shifts. In addition, there are 56 adds required to sum the multiplication results. Hence, the computational workload to perform the scalar product to generate one filtered component, is 16*57+56=968 adds and 15*57=855 shift operations.

Figure 4:
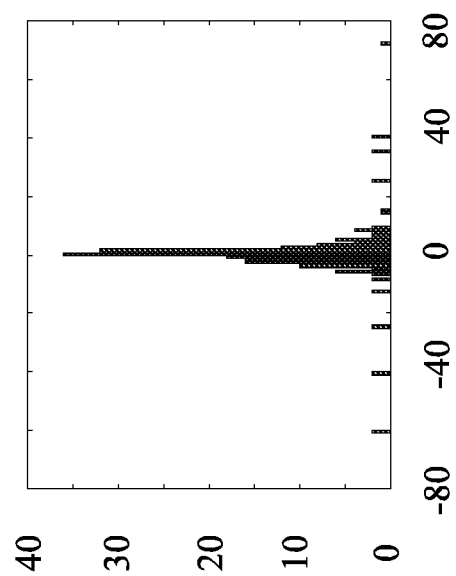
FIG. 4 illustrates the frequency distribution of the components of the approximation vector.

Consider a 197 tap filter for the same pass band in which the original filter coefficients are replaced by the closest pyramid vector from a set of pyramid vectors characterized by N=197 and K=999 to arrive at an approximation vector to be used in computing the scalar products. This filter will be referred to as an approximation filter in the following discussion. The frequency distribution of the components of the approximation vector are shown in FIG. 4. In contrast to the distribution of weights for the 57 tap filter, all but 13 of the coefficients have absolute values less than 20, and hence, the multiplications needed to compute the scalar product can be accomplished with a repeated add multiplier. If all of the multiplications are performed by a repeated add multiplier, the total workload is 999 adds. Hence, the approximation filter has a computational workload that is somewhat less than the 57 tap filter without the pyramid vector approximation.

Figure 5:
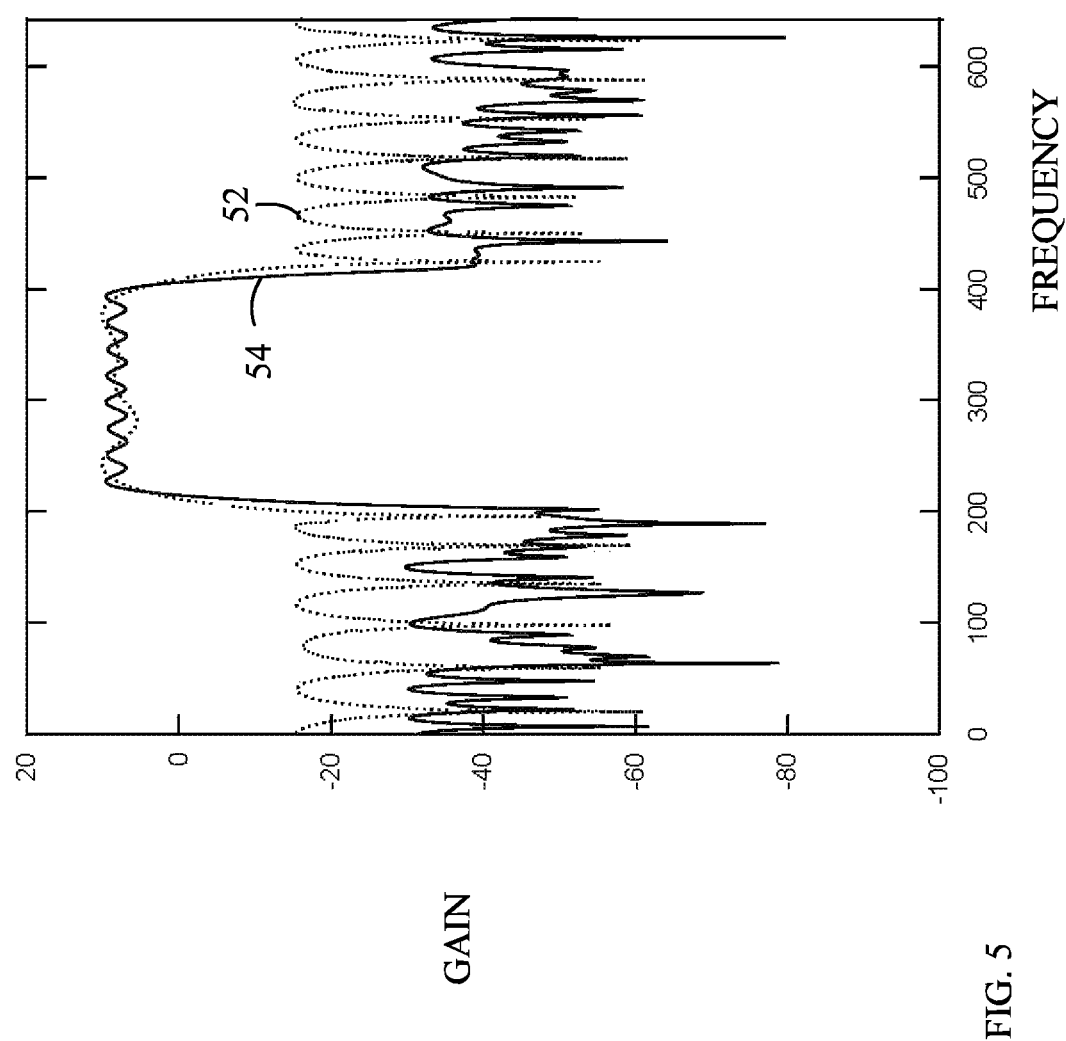
FIG. 5 illustrates the attenuation of each of the filters.

Refer now to FIG. 5, which illustrates the attenuation of each of the filters. The 197 tap approximation filter is shown at 54 and the 57 tap filter is shown at 52. The approximation filter has a steeper fall-off outside the pass band than the 57 tap filter. In addition, the out-of-band signal rejection is approximately 20 dB better for the approximation filter.

The above example assumes that all multiplies in the approximation filter are performed by a repeated add multiplier. However, as noted above, embodiments in which the multiplies for the larger filter coefficients are performed in a conventional add and shift multiplier while the remaining multiplies are performed in a repeated add multiplier are also possible. The components of the approximation filter can be represented by a sign bit plus 7 bits. Hence, a conventional multiply requires 7 adds and 6 shifts. If all of the components having absolute values greater than 16 utilize a conventional multiply, the workload would be reduced to approximately 500 adds.

In the above example, K>N. However, embodiments in which K<N are also possible. As noted above, the greater the K value, the smaller the difference between the direction of the original vector, A, and the pyramid vector approximation for A, A'. However, if the particular application will allow the difference between A and A', the computational savings can be very large. If K<N, then at least N−K components of A' will be zero. In the case K=N−1, the number of adds is equal to the number adds in the conventional scalar product, but with the multiplies requiring no time. Hence, the time computational load savings can be a factor of 16 or more relative to the normal method for computing the scalar product.

The present invention is particularly useful in neural networks. In a neural network, each layer includes a plurality of neural nodes or processors. Each neural node is basically a filter whose output is processed by a non-linear function to provide an output that is passed to the next layer of the neural network. The first layer receives a plurality of sensor inputs that are analogous to the signal that is being processed by the filters. Each filter operates on a vector that includes a subset of all of the sensor inputs. The filter coefficients are determined during a training period in which the neural network is "shown" various items to be distinguished from one another and the filter coefficients are adjusted until the final layer correctly identifies the various classes. The present invention is based on the observation that the statistical distribution of the final filter coefficients for many neural networks implemented pattern recognition problems is approximately Laplacian. Hence, these filter coefficient vectors can be approximated by a pyramid integer component vector of the type discussed above, and the computational complexity reduced as discussed above. The optimum K value can be determined by reducing the initial K value to the point at which errors in the classification of the learning set are observed.

The scalar product approximation of the present invention can be implemented on any data processing system capable of providing an accumulator and the repeated add multiplier. The present invention is particularly well suited to data processors having large numbers of processors that can run in parallel such as graphics processors, as each processor can generate one term of the scalar product in parallel with the other processors. In addition, because of the simple hardware needed to implement a scalar product according to the present invention, the present invention can be implemented on field programmable gate arrays and special processing chips.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system to compute an approximation to a scalar product between first and second vectors characterized by N components, each component being characterized by an absolute value, said method comprising:
   providing a repeated add multiplier;
   replacing said first vector by a constant times a third vector that is a pyramid integer vector characterized by N components, each component of said pyramid integer vector being characterized by an absolute value and an integer K equal to a sum of said absolute values of said N components; and
   computing a scalar product of said third vector with said second vector utilizing said repeated add multiplier to provide said approximation to said scalar product between said first and second vectors.

2. The method of claim 1 wherein said approximation to said scalar product of said first and second vectors is characterized by an allowable error in said scalar product of said first and second vectors, and wherein K is chosen to have the smallest value for which said scalar product of said second and third vectors differs from said scalar product of said first and second vectors by less than said allowable error.

3. The method of claim 1 wherein K<N.

4. The method of claim 1 wherein said components of said first vector are characterized by a numerical representation requiring a predetermined number of bits, n, and K<nN.

5. A digital filter that filters a digital signal through a finite impulse filter having N taps, each tap being characterized by a tap value, said filter comprising:
   a port that receives one of said tap values, wherein said tap value is an integer; and
   a repeated add multiplier that multiplies one of said digital signal values by said one of said tap values by repeatedly adding or subtracting said one of said digital signal values into an accumulator K times, where K is equal to said tap value and said tap value is an integer.

6. The digital filter of claim 5 wherein said N tap values comprise a pyramid vector selected from a set of pyramid vectors having N components and a scaling coefficient.

7. The digital filter of claim 5 wherein said pyramid vector is characterized by a component K, and wherein N and K are chosen such that said digital filter approximates a digital filter having a number of taps less than N and a greater computational workload.

* * * * *